Nov. 19, 1968    F. ARONOWITZ    3,411,849
FREQUENCY STABILIZED LASER

Filed May 13, 1965    2 Sheets-Sheet 1

INVENTOR.
FREDERICK ARONOWITZ
BY Charles J. Ungemach
ATTORNEY

United States Patent Office 3,411,849
Patented Nov. 19, 1968

3,411,849
FREQUENCY STABILIZED LASER
Frederick Aronowitz, St. Louis Park, Minn., assignor to Honeywell Inc., Minneapolis, Minn., a corporation of Delaware
Filed May 13, 1965, Ser. No. 455,422
6 Claims. (Cl. 356—28)

ABSTRACT OF THE DISCLOSURE

Apparatus to frequency stabilize a ring laser by adjusting the cavity length so as to keep the intensities of the two counter-rotating light beams equal.

---

The present invention pertains to ring laser devices and more particularly to apparatus and methods to stabilize the frequency of oscillation of a ring laser. Although my novel frequency stabilization system is shown herein as employed in a laser angular rate sensor it should be understood that the novel and inventive techniques disclosed are equally suitable for use in any apparatus in which two oppositely directed traveling wave beams of light are generated by a laser medium about a closed loop path.

In an angular rate sensor type of device a laser generates two beams of light in opposite directions. Mirrors are utilized to direct the light about a closed loop path. If the device is stationary both beams will oscillate at an identical frequency. However, if the device rotates in the plane of the polygonal path the beam traveling with the rotation will be presented with an effective path length different from the beam traveling against the rotation. Since the frequency of a laser is dependent upon the length of the path or cavity in which it oscillates, one beam increases in frequency while the other beam decreases in frequency and this frequency difference may be monitored as a measure of the rotation. Substantially midway between these two frequencies is the frequency at which both beams would oscillate if the system was stationary. The present invention contemplates the stabilization of this inbetween or stationary condition frequency at a constant predetermined value so as to allow more consistent and accurate measurements.

The present invention is briefly describe as follows. The optical maser whose frequency is to be stabilized is constructed such that the normal modes which describe the ratiation in the polygonal path or cavity are of the form of traveling waves. The frequency of oscillation of the resonator is determined by the path length traversed by the light, before returning upon itself. Since the resonator generally will support a number of modes, in the preferred embodiment the cavity length is chosen to be small enough so that only one longitudinal mode lies above the threshold for oscillation, for typical operating gains of the system. It is also desirable in the preferred embodiment to limit the system to a single transverses mode by the use of apertures in the light path.

It has been found that two beams in a traveling wave ring laser have a characteristic relative amplitude as they operate at various frequencies. Furthermore, the amplitudes of the two beams are equal at one and only one frequency, namely, the inbetween or stationary condition frequency. Thus, in the present invention the ring system is stabilized at this one frequency by tuning or adjusting the cavity length in accordance with an equal amplitude condition.

Hence, it is an object of my invention to frequency stabilize a ring laser by equalizing the amplitudes or intensities of the two counter-rotating beams. Further objects and advantages will become apparent in the following description and drawings, in which.

Figure 1:
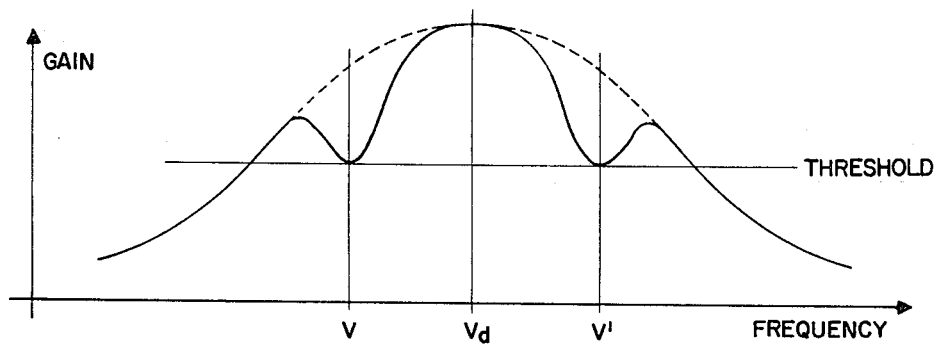
FIGURE 1 is a graph showing the gain of a laser as a function of its operating frequency in a stationary ring laser system.

FIGURE 1 shows a graph of the gain of a typical laser in a ring system as a function of the frequency of operation. An example of such a system may be seen by reference to FIGURE 5 in which a triangular laser ring system is shown. In FIGURE 1 $V_d$ indicates the center frequency of the atomic transition of the atoms of gas in the laser, that is, the frequency most easily generated by an excited atom in the laser gas. The atom is most likely to lase if it encounters radiation of the frequency $V_d$.

Suppose, for example, in FIGURE 1, that radiation of a frequency V is circulating in the laser ring system. This radiation will tend to interact with the class of atoms in the laser gas which have velocities in a direction opposite that of the radiation of frequency V of a magnitude such that the Doppler effect will cause the radiation of frequency V to appear to that class of atoms as having a frequency $V_d$. Consequently, radiation of frequency V traveling to the right will interact with all of the atoms traveling to the left with the correct velocity. The interaction with these atoms will remove the atoms from the class of atoms which may interact by lowering them to a stable energy level. As a result a dip in the gain curve will be formed as is shown at frequency V in FIGURE 1. The dashed line shows the shape of the gain curve when no lasing action is taking place. The atoms that are interacted with because they are traveling to the left also belong to a class of atoms which would have interacted with radiation traveling to the left of a frequency higher than that of $V_d$. Consequently, in FIGURE 1 another dip in the gain curve is indicated at a frequency V' which is higher than $V_d$. These dips or "holes" in the gain curve are the result of the well known "hole burning" phenomenon associated with laser action. The holes are deep enough so that they reach the threshold of laser action at which point the gain of the system is equal to the losses.

Figure 2:
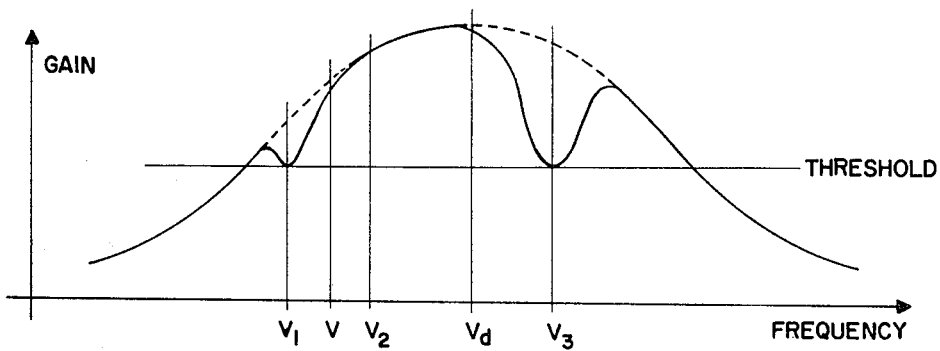
FIGURE 2 is a graph showing the gain of a laser as a function of its operating frequency in a ring laser system which is rotating.

If the laser ring system is now rotated about an axis perpendicular to the plane of the ring a condition results which is shown in FIGURE 2. The frequency of operation of the system V splits into a lower and higher frequency $V_1$ and $V_2$ respectively, one of the frequencies rotating to the right and the other frequency of radiation rotating to the left. For the purposes of explanation FIGURE 2 shows only the gain curve for radiation traveling in the direction of the radiation whose frequency is $V_1$. A hole is again burned in the gain curve at the frequency $V_1$. Since the radiation of frequency $V_2$ is using up a class of atoms whose speeds allow them to see the radiation of frequency $V_2$ as being of frequency $V_d$, this class of atoms is not available to amplify radiation traveling in the opposite direction at a higher frequency $V_3$. Consequently, another hole is burned in the gain curve for radiation traveling in the direction of the radiation of frequency $V_1$ as shown in FIGURE 2.

If the cavity length, that is, the distance traversed by radiation in the triangular ring system, is changed, the frequency V changes. In this way the frequency of operation of the system V may be varied across the entire gain curve. In this situation, as V moves toward $V_d$ in FIGURE 2, $V_1$ and $V_2$ accompany it. The image hole of $V_2$ at $V_3$ also moves toward $V_d$. The reason for this is that since the radiation at frequency $V_2$ interacts with the class of atoms having velocities to provide sufficient Doppler shifts to make $V_2$ appear as $V_d$, these atoms will be unavailable for interaction with radiation at a frequency higher than $V_d$, higher by the same amount that $V_2$ is lower than $V_d$. The results of this effect are shown in FIGURE 3 where frequency V has moved closer to $V_d$.

Figure 3:
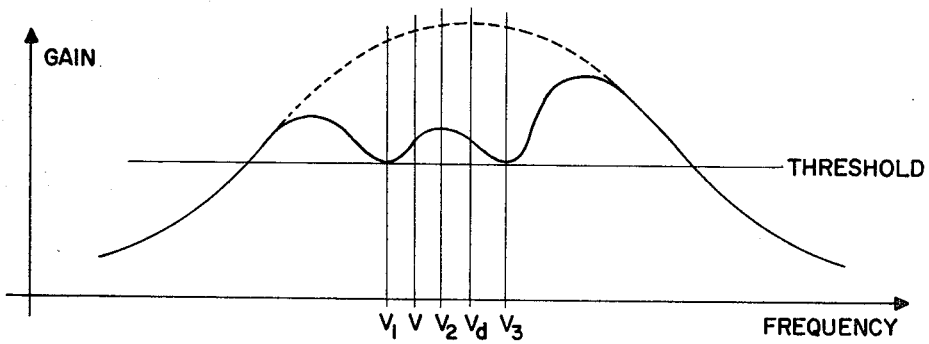
FIGURE 3 is a graph similar to that in FIGURE 2 demonstrating the variations that result from a change in the cavity length of the rotating ring laser system.

Although both holes in FIGURE 3 tend to become much larger as they move to higher points on the gain curve indicating a greater supply of atoms for interaction and a greater intensity of radiation, the two holes start to overlap indicating that the two classes of atoms are no longer mutually exclusive. A continuation of the process would lead to one single hole in the center of the gain curve which would have a much reduced gain and resultant intensity of radiation. If the intensity of radiation in one direction, such as the direction of the radiation of frequency $V_1$, is plotted as frequency V is swept across the gain curve a graph results such as is shown in FIGURE 4.

Figure 4:
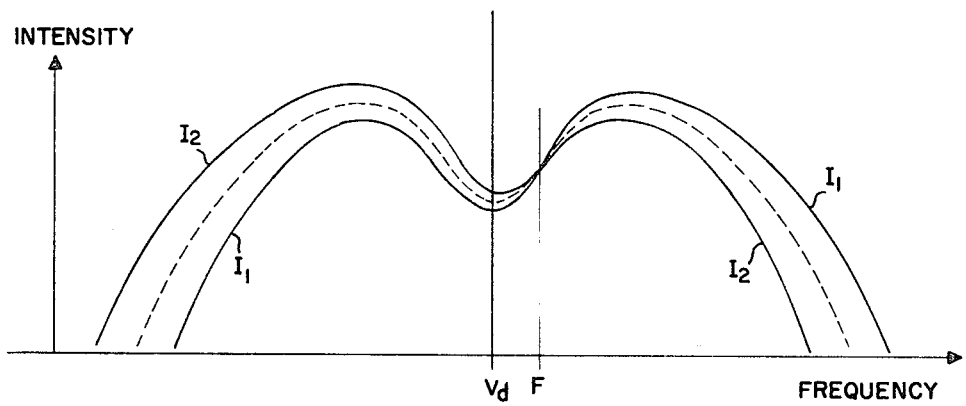
FIGURE 4 is a graph showing the intensities of the two counter-rotating beams as a function of the frequency in the same ring laser system.

In FIGURE 4 the intensity $I_1$ is the intensity of radiation traveling in the direction of the radiation of frequency $V_1$. At first the intensity starts to increase as V moves to the right. However, as the two holes start to overlap the gain decreases and the intensity dips in the middle around the frequency $V_d$. As the holes cross-over each other and again reappear in a configuration similar to that shown in FIGURE 2, but reversed, the intensity $I_1$ again increases until the frequency V leaves the portion of the gain curve which is above the threshold level and $I_1$ goes to zero.

If the intensity of the radiation traveling in the direction of the radiation of frequency $V_2$ is plotted a curve $I_2$ results as is shown in FIGURE 4. The reason that curves $I_2$ and $I_1$ are different is that $I_1$ and $I_2$ are proportional to the area of the holes burnt into the gain curve. Each of the holes is burnt down to the same depth and the effect of the rotation is to shift one frequency to a higher point on the gain curve and the other to a lower point on the gain curve thus making the areas of the holes different. As a result, it is found that the ratio of the intensities of the oppositely directed beams may be greater than or less than unity, depending upon the position of the frequency of V of the unrotated system with respect to the gain curve. Using a helium-neon laser for a specific illustration for the case when the neon is composed of the isotopes $Ne^{20}$ and $Ne^{22}$ with the concentration of $Ne^{20}$ being enriched at the expense of the $Ne^{22}$, a plot of the intensities results in two curves such as shown in FIGURE 4. The dashed curve is the intensity of either beam in the absence of rotation of the laser ring system.

It can be seen in FIGURE 4 that there is a frequency F where the intensity of both opposite directed beams are equal. This point lies between the centers of the atomic transition frequencies of the two isotopes. For increasing concentrations of the isotope $Ne^{22}$, the cross-over frequency F moves towards the center of the atomic transition frequency of $Ne^{22}$. For equal concentrations of $Ne^{20}$ and $Ne^{22}$ the cross-over point lies midway between the centers of the atomic transition frequencies of the two isotopes. It should be emphasized that for a fixed ratio of known lasing gases the point at which the intensities of the two beams $I_1$ and $I_2$ are equal will be at a fixed and constant frequency.

If the laser ring system rotates in the opposite direction, the curves $I_1$ and $I_2$ are exchanged. For sinusoidal rotations the curves $I_1$ and $I_2$ oscillate about the cross-over point, which remains fixed in frequency. Hence, there is a natural point about which to stabilize the frequency of oscillation of the traveling wave optical maser.

If a calculation is made of the intensity difference between $I_1$ and $I_2$ for small excursions in frequency about the cross-over point the following is obtained:

$$I_2 - I_1 = 2 \frac{\Delta f(1 + d^{-1}G^{-1})(hae^{-h2} - f)}{f^2/b^2 + ae^{-h2}(1 + 2hf)}$$

(Equation 1)

where $a$ is equal to the relative concentration of $Ne^{22}$ with respect to $Ne^{20}$;

$b$ is the ratio of the natural frequency width for the atomic transition to the Doppler frequency width;

$G$ is the ratio of the gain of the system to the loss of the system;

$d$ is equal to the percentage of $Ne^{20}$ in the laser gas;

$f$ is equal to the normalized frequency difference between the frequency of oscillation of the unrotated system, and $V_d$ for $Ne^{20}$;

$h$ is equal to the normalized frequency difference between the centers of atomic transition of $Ne^{22}$ and $Ne^{20}$; and $\Delta f$ is equal to $\frac{1}{2}(f_2 - f_1)$ and is proportional to the rotation rate of the system.

All frequencies are normalized with respect to the Doppler width of the atomic transition and the intensity is given in normalized units. For the above illustration the derivation has assumed that $a$ is very much smaller than 1. It can be seen from Equation 1 that the cross-over point depends on the separation between isotopes and the relative concentration of the two isotopes.

Figure 5:
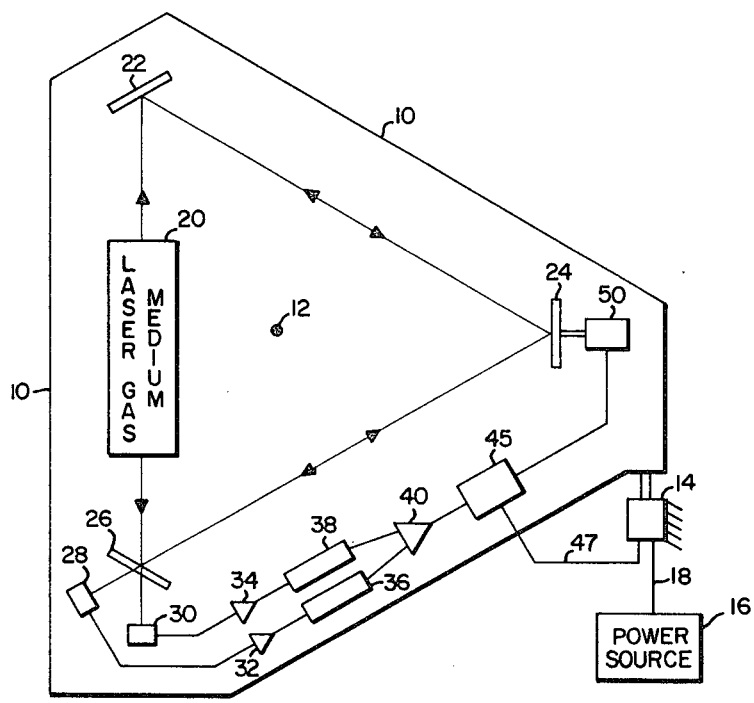
FIGURE 5 is a schematic diagram of one possible embodiment of the present invention.

Apparatus to stabilize the system about the frequency F is shown in FIGURE 5. A base 10 is shown adapted to rotate about an axis 12 in small oscillations determined by a drive mechanism 14. Drive mechanism 14 may be any electromechanical device suitable to oscillate base 10 about the axis 12, and is driven by a power supply 16 through a conductor 18. A laser gas medium 20 is mounted on base 10 and transmits two beams of light in opposite directions about a triangle defined by a group of dielectric mirrors 22, 24, and 26 mounted on base 10. The intensity of the two counter-rotating beams is monitored by a pair of photodetectors 28 and 30 which detect a fixed percentage of each beam passing through partially transparent mirror 26. As drive mechanism 14 oscillates the base and the triangular laser ring system about the axis 12 the two counter-rotating beams change in intensity as described with reference to FIGURE 4. That is, the back and forth oscillation of base 10 causes $I_1$ and $I_2$ to interchange about the cross-over point at frequency F. Consequently, if the system is operating at the frequency F no change in relative intensity is perceived by detectors 28 and 30. However, if the system should drift to a different operating frequency than F the intensities $I_1$ and $I_2$ will change relative to each other and this change will be detected by detectors 28 and 30 as two modulations in the intensity which are 180° out-of-phase. The relative phase of $I_1$ and $I_2$ compared to the phase of the oscillation caused by drive mechanism 14 will be dependent upon whether the system is to the left of the frequency F or to the right of the frequency F as shown in FIGURE 4.

The signals from detectors 28 and 30 are presented to a pair of alternating current amplifiers 32 and 34 respectively and thence to a pair of logarithmic converters 36 and 38, and finally to a difference amplifier 40. The output of difference amplifier 40 consists of the logarithm of the signal $I_1$ minus the logarithm of the signal of $I_2$ which is the logarithm of the ratio of $I_1$ to $I_2$. The logarithm of the ratio of $I_1$ to $I_2$ is approximately equal to $I_2 - I_1$ divided by the average intensity of the beams. Hence the output of difference amplifier 40 is proportional to the magnitude of the difference between the intensities of the two counter-rotating beams and has a phase indicative of the direction in which the system has drifted from the frequency F as defined by Equation 1.

A phase demodulator 45 receives the output of difference amplifier 40 and compares it to a reference frequency obtained from the drive mechanism 14 by a conductor 47. The output of phase demodulator 45 is a DC current of magnitude representative of the amount of frequency drift and polarity representative of the direction of drift. This output is presented to a cavity length controlling means 50 which may be a magnetostrictive device or any device suitable to move mirror 24 in a manner such that the length of the triangular path between mirrors 22, 24, and 26 may be adjusted to increase the frequency of operation if the system is below F and to decrease the frequency of operation if the system is above F. When the system is again operating about the frequency F no difference in intensity of the two beams will be perceived by detectors 28 and 30 and hence, no further control signals will be presented to cavity length controlling means 50. As an alternative, cavity length controlling means 50 may be a temperature controlling means operable to vary the effective path length by changing the temperature.

It should be understood that many variations and modifications may be made to the apparatus disclosed which are within the spirit and scope of the invention. Therefore, I do not intend to be limited by the specific apparatus and embodiments shown except as defined in the appended claims.

I claim:

1. In a system to equalize the frequencies of two laser beams traveling in opposite directions about a closed loop path the combination of:
   means for comparing the amplitudes of the two beams; and
   means connected to said comparing means operable to change the effective optical path length of the laser so as to equalize the amplitudes of the two beams so as to insure that the two beams oscillate at the same frequency.

2. Apparatus to frequency stabilize an angular rate sensor in which a laser generates two beams of light in opposite directions about a closed loop path, the difference in frequency therebetween being indicative of the angular rate of the system, comprising in combination:
   means measuring the intensities of the two counter-rotating beams;
   means connected to said measuring means for producing a signal indicative of the magnitude and sign of the difference in intensity between the two counterrotating beams; and
   means to change the optical path length and thereby control the frequency of operation of said laser in accordance with the signal so as to maintain the intensities of the two counter-rotating beams equal.

3. Apparatus to frequency stabilize an angular rate sensor in which a laser generates two beams of light in opposite directions about a closed loop path, the difference in frequency therebetween being indicative of the angular rate of the system, comprising in combination:
   means measuring the intensities of the two counter-rotating beams;
   means connected to said measuring means for producing a signal indicative of the magnitude and sign of the difference in intensity between the two counter-rotating beams; and,
   means to change the effective path length of the ring laser system and, thereby, the frequency of operation in accordance with the signal producing means so as to maintain the intensities of the two counter-rotating beams equal.

4. Apparatus of the class described comprising:
   a ring laser system containing two counter-rotating beams of light in a path defined by a plurality of mirrors;
   detectors operable to measure the intensity of the two oppositely rotating beams of light;
   a difference amplifier connected to said detectors to produce a signal indicative of the magnitude and sign of the difference in intensity between the two counter-rotating beams; and,
   mirror moving means connected to said difference amplifier and operable to change the effective path length of the ring laser system in accordance with a signal from said difference amplifier so as to equalize the intensities of the two counter-rotating beams and thereby maintain the operation of the ring laser system at a fixed frequency.

5. Apparatus of the class described comprising:
   a ring laser system containing two counter-rotating beams of light in a path defined by a plurality of mirrors;
   detectors operable to measure the intensity of the two oppositely rotating beams of light;
   drive means operable to vibrate said ring laser system so as to present effectively different path lengths to said two counter-rotating beams of light;
   phase comparison means connected to said detectors and to said drive means to produce a signal representative of the amount and sign of the difference in intensity between the two counter-rotating beams; and,
   means for controlling the effective cavity length, attached to the ring laser system, adapted to receive the signal from said phase comparison means and control the effective cavity length in accordance therewith to stabilize the frequency of oscillation of said ring laser system by equalizing the intensities of the two beams.

6. Apparatus of the class described comprising:
   a ring laser system containing two counter-rotating beams of light in a path defined by a plurality of mirrors;
   detectors operable to measure the intensity of the two oppositely rotating beams of light;
   drive means operable to vibrate said ring laser system so as to present effectively different path lengths to said two counter-rotating beams of light;
   a difference amplifier connected to said detectors to produce a signal representative of a difference in intensity between the two counter-rotating beams;
   phase demodulating means, connected to the difference amplifier and connected to the drive means, operable to provide a signal of magnitude and sign indicative of the respective amount and direction that said ring laser system varies from a predetermined frequency; and
   mirror moving means attached to the mirrors in the ring laser system, adapted to receive the signal from said phase demodulating means and move in accordance therewith to stabilize the frequency of oscillation of said ring laser system.

References Cited

UNITED STATES PATENTS 3,170,122  2/1965  Bennett _____ 331—94.5
3,323,411  6/1967  Killpatrick.

JEWELL H. PEDERSEN, *Primary Examiner.*

B. J. LACOMIS, *Assistant Examiner.*